US011330600B2

(12) United States Patent
Desai et al.

(10) Patent No.: US 11,330,600 B2
(45) Date of Patent: May 10, 2022

(54) COHESIVE RESOURCE MANAGEMENT FOR WIRELESS NETWORKS

(71) Applicant: Cisco Technology, Inc., San Jose, CA (US)

(72) Inventors: Vishal S. Desai, San Jose, CA (US); Robert E. Barton, Richmond (CA); Bart A. Brinckman, Nevele (BE); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 37 days.

(21) Appl. No.: 16/752,435

(22) Filed: Jan. 24, 2020

(65) Prior Publication Data
US 2021/0235459 A1 Jul. 29, 2021

(51) Int. Cl.
H04W 84/12 (2009.01)
H04W 72/08 (2009.01)
H04W 48/16 (2009.01)
H04W 52/24 (2009.01)

(52) U.S. Cl.
CPC ......... H04W 72/082 (2013.01); H04W 48/16 (2013.01); H04W 52/243 (2013.01); H04W 84/12 (2013.01)

(58) Field of Classification Search
CPC ..... H04W 84/12; H04W 88/08; H04W 28/18; H04W 12/08; H04W 92/14; H04W 24/02
See application file for complete search history.

(56) References Cited

U.S. PATENT DOCUMENTS 8,170,488 B2 5/2012 Cordeiro et al.
9,042,361 B2 5/2015 Makhlouf et al.
9,661,515 B2 5/2017 Lord et al.
10,420,002 B2 9/2019 Backes et al.
2008/0316982 A1 12/2008 Murty et al.
2013/0229930 A1 9/2013 Akay et al.
2013/0301607 A1* 11/2013 McCann ............. H04W 12/069
370/331

(Continued)

FOREIGN PATENT DOCUMENTS

WO 2017123862 A1 7/2017

OTHER PUBLICATIONS

PCT Notification of Transmittal of The International Search Report and The Written Opinion of The Interantional Searching Authority, or The Declaration for Application PCT/US2021/070075 dated May 4, 2021.

Primary Examiner — Tu X Nguyen
(74) Attorney, Agent, or Firm — Patterson + Sheridan, LLP

(57) ABSTRACT

A system and method for optimizing access points (APs) within a network comprises receiving, at a first AP, parameters corresponding to a second AP, and determining that the first AP and the second AP are part a first and a second wireless local area network (WLAN), respectively. The first and second WLANs support client credential sharing allowing seamlessly transitioning of a client device between the first and second WLANs using common credentials. Further, co-channel interference between the first AP and the second AP is detected based on the parameters corresponding to the second AP and parameters of the first AP, and at least one of a channel and transmission power of one or more of the first AP and the second AP is changed in response to the detection of the interference.

20 Claims, 5 Drawing Sheets

(56) References Cited

U.S. PATENT DOCUMENTS

2015/0236912 A1*  8/2015  Zhang ................ H04L 41/0889
                                                        370/338
2016/0234792 A1   8/2016  Zhuang et al.
2017/0026960 A1   1/2017  Mestanov et al.
2019/0075469 A1*  3/2019  Mahoney .............. H04W 16/12

* cited by examiner

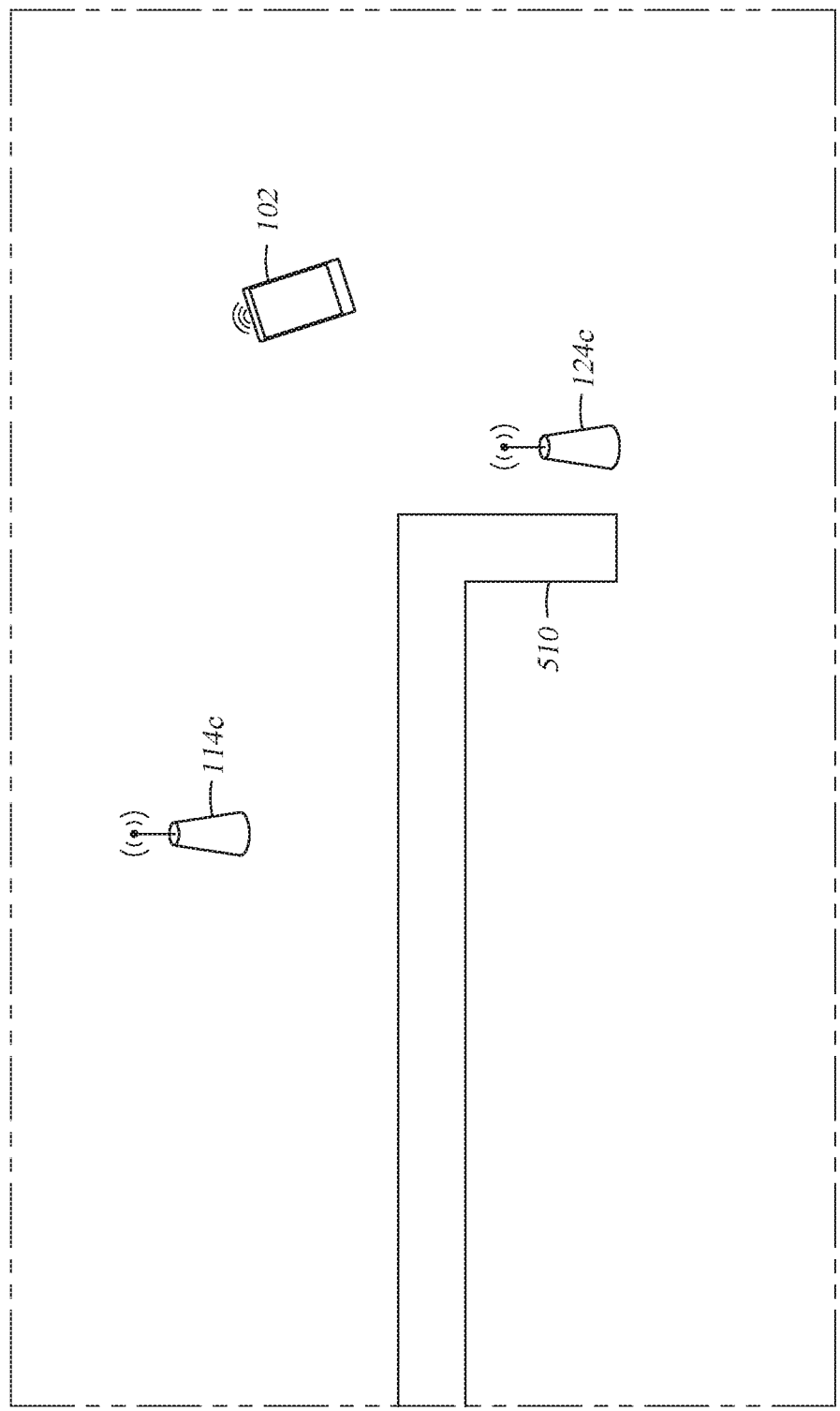

COHESIVE RESOURCE MANAGEMENT FOR WIRELESS NETWORKS

TECHNICAL FIELD

Embodiments presented in this disclosure generally relate to controlling the parameters of the access points (APs) in communication networks. More specifically, though not exclusively, embodiments disclosed herein relate to mitigating co-channel interference between APs of different wireless network systems.

BACKGROUND

In many cases, access points (APs) within a wireless network are managed to provide the greatest amount of coverage for a corresponding wireless network. However, as the number of wireless networks and corresponding networked devices increases, the likelihood of interference between devices of different wireless network systems increases. Many wireless networks either randomly assign channels to respective connected APs or employ various techniques to optimize channel allocation among the respective connected APs. Such methods optimize the APs within each wireless network, however, interference may still exist between neighboring APs of different wireless networks. Accordingly, the quality of service experienced by a client device is poor which may cause dropped connections between client devices and the wireless networks and difficulty when transitioning between wireless networks.

Thus, there is a need to detect neighboring wireless networks and a method to organize channel allocation across neighboring wireless network systems.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 5 illustrates an example configuration of access points, according to one or more embodiments.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
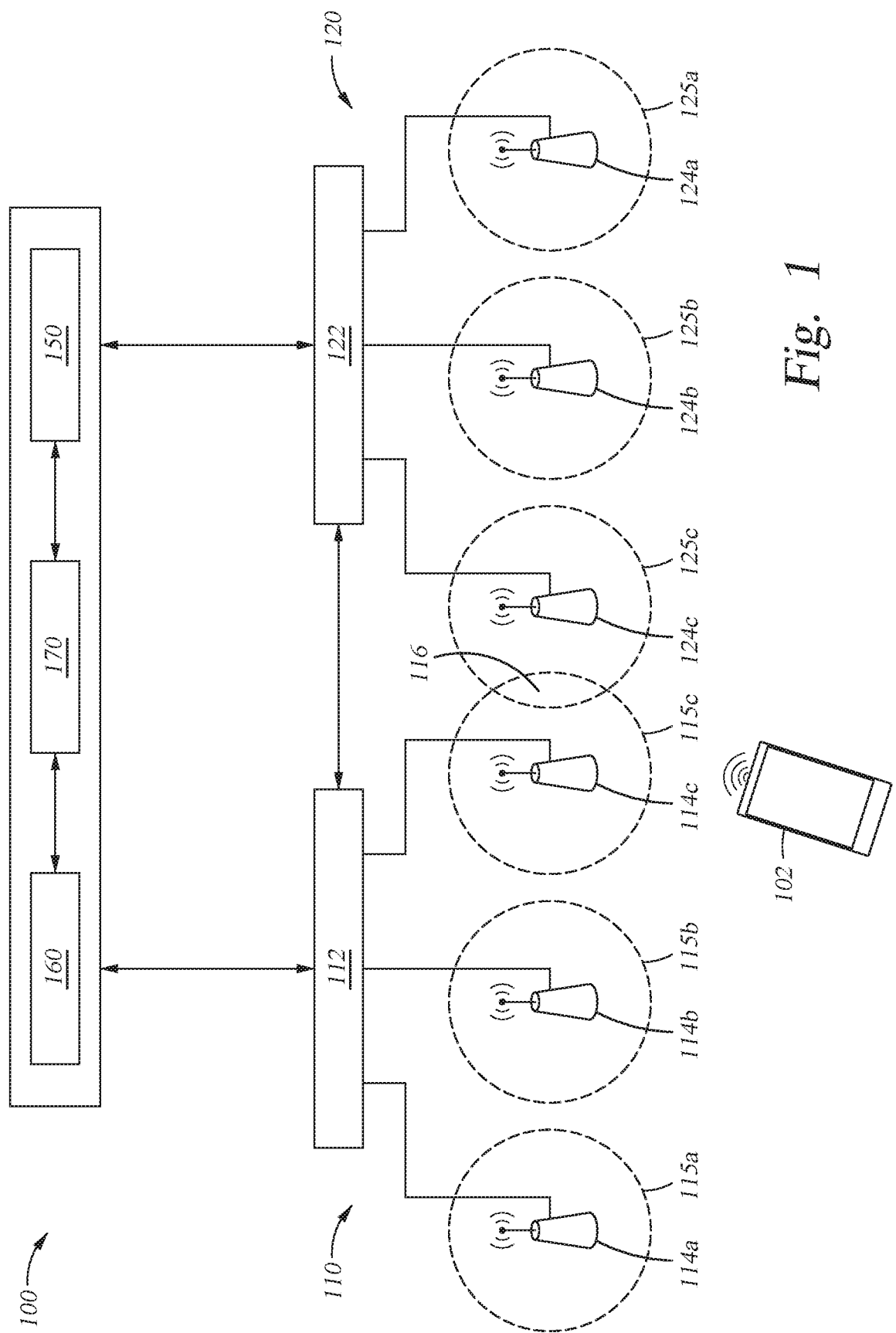
FIG. 1 illustrates a network comprising a plurality of access points, according to one or more embodiments.

One embodiment presented in this disclosure describes a method for optimizing access points (APs) within a network comprises receiving, at a first AP, parameters corresponding to a second AP, and determining that the first AP and the second AP are part a first and a second wireless local area network (WLAN), respectively. The first and second WLANs support client credential sharing allowing seamlessly transitioning of a client device between the first and second WLANs using common credentials. The method further comprises detecting co-channel interference between the first AP and the second AP based on the parameters corresponding to the second AP and parameters of the first AP, and changing at least one of a channel and transmission power of one or more of the first AP and the second AP in response to the detection of the interference.

One embodiment presented in this disclosure describes a wireless network system comprises a first access point (AP), a second AP, and a controller. The first AP is configured to receive parameters corresponding to a second AP. The controller is coupled to at least of the first AP and the second AP. The controller is configured to determine that the first AP and the second AP are part a first and a second wireless local area network (WLAN), respectively. The first and second WLANs support client credential sharing allowing seamlessly transitioning of a client device between the first and second WLANs using common credentials. The controller is further configured to detect co-channel interference between the first AP and the second AP based on the parameters corresponding to the second AP and parameters corresponding to the first AP. Additionally, the controller is configured to change at least one of a channel and transmission power of one or more of the first AP and the second AP in response to the detection of the co-channel interference.

One embodiment presented in this disclosure describes a network comprises a first wireless network system forming a first local area network (WLAN), a second wireless network system forming a second WLAN, and a cloud computing system. The first wireless network system comprises a first access point (AP) and a first network controller coupled to the first AP. The second wireless network system comprises a second AP configured to receive parameters corresponding to the first AP and a second network controller coupled to the second AP. The cloud computing system is coupled to the first network controller and the second network controller. The cloud computing system is configured to determine that the first AP is assigned to the first WLAN and the second AP is assigned to the WLAN based on the parameters corresponding to the first AP and parameters corresponding to the second AP. The cloud computing system is further configured to determine, based on the parameters corresponding to the first AP, that the first WLAN supports client credential sharing allowing seamlessly transitioning of a client device between the first and second WLANs using common credentials. Additionally, the cloud computing system is configured to detect co-channel interference between the first AP and the second AP based on the parameters corresponding to the first AP, and change at least one of a channel and transmission power of one or more of the first AP and the second AP in response to the detection of the co-channel interference.

Example Embodiments

Optimization of the operating parameters of access points (APs) is often completed internally within a network system (e.g., a common wireless local area network (WLAN)). However, such methods for optimization may still allow for co-channel interference between APs of different network system that have overlapping coverage areas. Accordingly, difficulties may arise when a mobile device attempts to transition between the APs experiencing co-channel interference. Alternatively, by optimizing the channels of APs of different network systems and having overlapping coverage areas, co-channel interference between these APs is mitigated. Thus, mobile devices may more easily transition between the different wireless network systems without experiencing a drop in connection.

FIG. 1 illustrates a network 100, according to one embodiment. As shown, the network 100 includes a first wireless network system 110 and a second wireless network system 120. The wireless network system 110 includes a network controller 112 and APs 114a-114c. In general, the APs 114a-114c are in communication with each other and are also in communication with the network controller 112 to provide a corresponding WLAN. The APs 114a-114c have corresponding coverage areas 115a-115c. In various embodiments, the wireless network system 110 includes more than three APs or less than three APs.

The network controller 112 may include one or more processors and a memory. One or more applications may be stored within the memory and executable by the one or more processors. For example, the applications may be executed by the processors to configure the operating parameters of the APs 114a-114c. Configuring the operating parameters of the APs 114a-114c includes setting at least one of a channel and transmission power of the APs 114a-114c. The network controller 112 may set the channel and/or transmission power of the APs 114a-114c to minimize interference between the APs 114a-114c while maximizing the corresponding WLAN coverage area.

Minimizing the interference between the APs 114a-114c reduces interference between basic service sets (BSSs) within a wireless network. The interference between BSSs may be referred to as overlapping BSS (OBSS) interference. In one or more embodiments, optimizing the APs 114a-114c to mitigate interference comprises mitigating interference in regions of overlap between corresponding coverage areas 115a-115c of the APs 114a-114c.

The wireless network system 120 includes a network controller 122 and APs 124a-124c. In general, the APs 124a-124c are in communication with each other and are also in communication with the network controller 122 to provide a corresponding WLAN. The APs 124a-124c have corresponding coverage areas 125a-125c. In various embodiments, the wireless network system 110 includes more than three APs or less than three APs. In various embodiments, the wireless network system 120 has more APs than that of the wireless network system 110. Alternatively, the wireless network system 110 has more APs than that of the wireless network system 120.

The network controller 122 may include one or more processors and memory. Further, one or more applications may be stored within the memory and executable by the one or more processors. For example, the applications may be executed by the processors to configure the operating parameters of the APs 124a-124c. Configuring the operating parameters of the APs 124a-124c includes setting at least one of a channel and transmission power of the APs 124a-124c. The network controller 122 may set the channel and/or transmission power of the APs 124a-124c to minimize interference between the APs 124a-124c while maximizing the corresponding WLAN coverage area. For example, the channels and/or transmission power of the APs 124a-124c are optimized to mitigate interference that exists between coverage areas 125a-125c of the APs 124a-124c.

In various embodiments, the wireless network systems 110 and 120 share credentials such that mobile devices (e.g., the mobile device 102 which can be a mobile phone, tablet, laptop, and the like) can seamlessly associate and seamlessly transition between the WLANs of the wireless network systems 110 and 120. In one or more embodiments, the wireless network systems 110 and 120 are not the same extended service set (ESS) and sharing of the credentials allows for mobile devices to seamlessly associate and seamless transition between the wireless networks systems. In one or more embodiments, sharing of credentials to allow mobile devices to seamlessly transitioning between the corresponding WLANs may be achieved through a central user management federation 170 (referred herein as the federation). In one or more embodiments, the federation 170 transparently connects a mobile device (e.g., the mobile device 102) attempting to connect to a WLAN to an identity provider (e.g., one or more of the identity provides 160) that validates the credentials (e.g., user credentials) corresponding to the mobile device. In one or more embodiments, the federation 170 returns a validation of the credentials to a wireless network system (e.g., the wireless network systems 110 or 120) and/or an access provider 150. In some embodiments, the federation 170 is further configured to communicate contextual information (e.g., policies associated with a user) to a wireless network system (e.g., the wireless network systems 110 or 120).

In one or more embodiments, access to the wireless network system 110 and 120 may be controlled via corresponding access providers 150. The access providers 150 may be public venues, retailers, airports, and large enterprises, among others. Each wireless network system 110 and 120 is associated to one of the access providers 150. For example, in one embodiment, a first one of the access providers 150 is associated to the wireless network system 110 and a second one of the access providers 150 is associated to the wireless network system 120.

The wireless network systems 110 and 120 are also in communication with one or more identity providers 160 via the federation 170. The identity providers 160 may identify a user of a mobile device, authenticates the user and determines associated rights for a user. The identity providers 160 include service providers and cloud providers, among others. The identity providers 160 communicate with the mobile device 102 and/or the wireless network system 110 and 120 to authenticate the mobile device 102. In one embodiment, when the mobile device 102 attempts to gain access to the WLAN corresponding to the wireless network system 110, the network controller 112 communicates with one or more of the identity providers 160 via the federation 170 to determine rights associated with a user of the mobile device 102. The wireless network system 110 communicates data to and from the federation 170 which communicates data with the identity providers 160. The identity providers 160 identify the user and transmit an indication as to whether or not user authentication was successful to the network controller 112 via the federation 170. In embodiments where authentication was successful, the identity providers 160 may additionally communicate authorizations, or policies, associated with a user of the mobile device 102. The network controller 112 may then grant the mobile device 102 access to the corresponding WLAN. If the identity providers 160 are unable to authenticate the mobile device 102, the network controller 112 rejects access of the mobile device 102 to the corresponding WLAN. In one embodiment, once a mobile device associated with a user (e.g., the mobile device 102) is authenticated by one or more of the identity providers 160, the mobile device is authenticated to each wireless system that supports seamless transitioning of mobile devices.

In one or more embodiments, the wireless network systems 110 and 120 support seamless transitioning of mobile devices between the WLANs of the wireless network systems. Accordingly, once the mobile device 102 is authenticated by one or more of the identity providers 160, the mobile device 102 is granted access to both wireless network systems 110 and 120. Thus, the mobile device 102 may seamlessly transition between the wireless network systems 110 and 120 without having to enter authentication credentials to each wireless network system 110 and 120 individually. Stated another way, a user may be able to seamlessly transition between the wireless network systems 110 and 120 without having to be re-authenticated to either WLAN of the wireless network systems 110 and 120. However, in one or more embodiments, co-channel interference may occur within an overlapping coverage area between APs of the different wireless network systems 110 and 120. For example, co-channel interference that may occur within a region of overlap 116 between coverage areas 115c and 125c of the APs 114c and 124c, respectively. In such embodiments, the co-channel interference may prevent a mobile device from seamlessly transitioning between APs of the different wireless network systems. However, optimizing the operating parameters of the APs of different wireless network systems having the overlapping regions may mitigate the co-channel interference and improve the ability for mobile devices to connect to and seamlessly transition between the APs.

Figure 2:
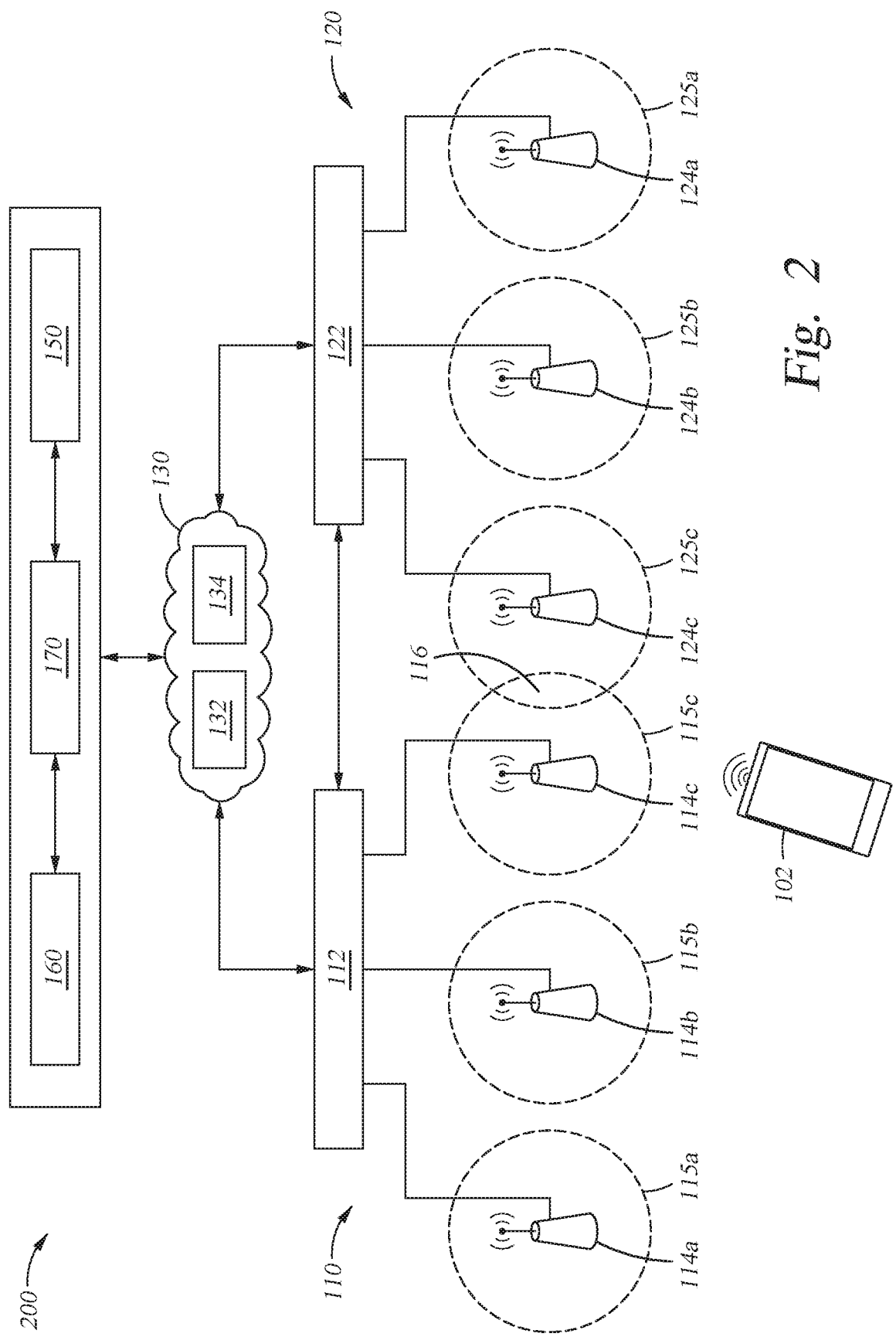
FIG. 2 illustrates a network comprising a plurality of access points and a cloud computing system, according to one or more embodiments.

FIG. 2 illustrates a network system 200, according to one or more embodiments. The network system 200 includes the wireless network system 110 and the wireless network system 120 as described with regard to FIG. 1. As compared to the embodiment of FIG. 1, the network system 200 includes a cloud computing system 130. The cloud computing system 130 communicates with the wireless network systems 110 and 120. Further, the cloud computing system 130 communicates with the access providers 150, the identity providers 160, and the federation 170. The cloud computing system 130 communicates with the access providers 150, the identity providers 160, and the federation 170 to authenticate the mobile device 102 and allow the mobile device 102 to seamlessly transition between the WLANs of the wireless network systems 110 and 120.

The cloud computing system 130 may include one or more controllers 132 and a radio resource management (RRM) component 134. The RRM component 134 provides a system level management of co-channel interference, radio resources, and other radio transmission characteristics in the network 100. The RRM component 134 includes core algorithms for controlling parameters such as transmission power, user allocation, beamforming, data rates, handover criteria, modulation scheme, error coding scheme, etc. In one embodiment, the RRM component 134 receives inter-radio measurement data reported from the wireless network controllers 112 and 122. The inter-radio measurement data may include but is not limited to the channel frequency between two radios of different APs, transmission power, antenna information and the received signal strength indicator (RSSI) or path loss between two radios of different APs.

In one embodiment, the RRM component 134 performs the inter-radio measurement based on a discovery message. For example, the radio in each AP 114 and 124 broadcasts a discovery message to all other radios in all other APs on all channels so that all other radios operating on different channels can receive the discovery message. The discovery message may have a predefined packet format.

In one or more embodiments, the network controller 112 and the network controller 122 communicate directly with each other. In such embodiments, the network controllers 112 and 122 communicate information directly between each other without the information first being communicated to the cloud computing system 130. Alternatively, the network controllers 112 and 122 first communicate information to the cloud computing system 130 and the cloud computing system 130 then communicates the information to the network controllers 112 and 122.

The operating parameters of the APs 114a-114c are often optimized separately from the operating parameters of the APs 124a-124c. For example, in one embodiment, the network controllers 112 and 122 allocate the operating parameters for the APs 114a-114c and 124a-124c, respectively. Alternatively, or additionally, the RRM component 134 instructs each of the network controllers 112 and 122 how to allocate the operating parameters for the APs 114a-114c and 124a-124c, respectively. However, by optimizing the operating parameters of the APs 114a-114c separately from the operating parameters of the APs 24a-124c, one or more of the APs 114a-114c and APs 124a-124c that are in range of each other may be assigned to the same channel. Accordingly, one or more of the APs 114a-114c may interfere with one or more of the APs 124a-124c. For example, in one embodiment, the AP 114c and the 124c may be assigned the same channel. Thus, the APs 114c and 124c may interfere with each other in the region of overlap 116 of the corresponding coverage areas 115c and 125c, inducing co-channel interference. The region of overlap 116 in coverage areas may be referred to as a co-channel interference zone.

Due to the co-channel interference, the mobile device 102 may experience difficulties in connecting with either the AP 114c or the AP 124c. Further, the interference due to the co-channel interference negatively affects the ability for the mobile device 102 to seamlessly transition between the AP 114c and the AP 124c. However, by optimizing the operating parameters for the APs (e.g., the APs 114a-114c and 124a-124c) having overlapping coverage areas and that are part of different wireless network systems, the interference due to the co-channel interference may be mitigated. As such, mobile devices may more easily seamlessly transition between the wireless network systems 110 and 120 without experiencing a drop in connection.

Figure 3:
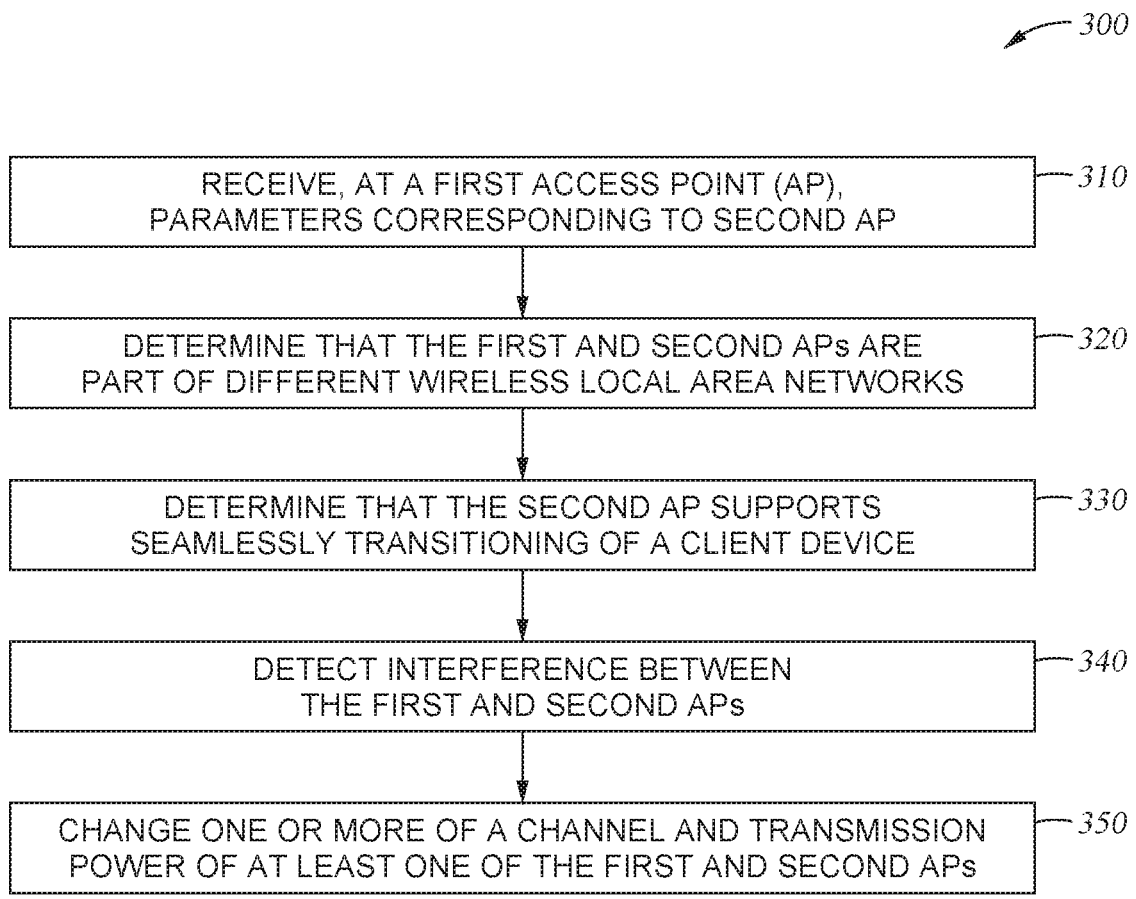
FIG. 3 is a flowchart illustrating a method for organizing access points, according to one or more embodiments.

FIG. 3 illustrates a method 300 for optimizing APs of different wireless network systems, according to one or more embodiments. At operation 310, the AP 114c receives parameters corresponding to the AP 124c. For example, the AP 124c transmits a discovery message (e.g., a beacon) which is received by the AP 114c. In one or more embodiments, the AP 114c enters a discovery mode during which the AP 114c scans through a plurality of channels to detect discovery messages transmitted by other APs. The AP 114c may enter the discovery mode according to an interval. Further, the AP 124c may switch from a first channel to a second channel to transmit the corresponding discovery message. The AP 124c may switch channels and transmit a discovery message according to an interval. The discovery message is a radio frequency (RF) message that includes information corresponding to the transmitting AP. For example, the discovery message includes one or more of an identifier, listing of capabilities, support of seamless transitioning of mobile devices, channel allocation, and a vender identifier, among others. In one embodiment, the discovery message includes a media access control (MAC) address assigned to the AP 124c.

At operation 320, one or more of the network controller 112 and the cloud computing system 130 determines that the APs 114c and 124c are part of different wireless network systems. With reference to FIG. 1, the AP 114c provides the discovery message transmitted by the AP 124c to the network controller 112 and the network controller 122 determines whether or not the AP 124c is part of the wireless network system 110. For example, the network controller 112 compares the MAC address of the AP 124c to the list of MAC address assigned to the wireless network system 110. If the MAC address of the AP 124c matches one of the MAC addresses assigned to the wireless network system 110, the AP 124c is determined to be part of (e.g., assigned to) the wireless network system 110. Alternatively, if the MAC address of the AP 124c does not match one of the MAC addresses assigned to the wireless network system 110, the AP 124c is determined to be part of a wireless network system other than the wireless network system 110. In another embodiment, the AP 114c provides the discovery message transmitted by the AP 124c to the network controller 112 and the network controller 112 provides the discovery message or information from the discovery message to the cloud computing system 130. For example, the network controller 112 may process the discovery message to identify one or more parameters corresponding the AP 124c and transmit the one or more parameters to the cloud computing system 130. In one embodiment, the network controller 112 identifies the MAC address of the AP 124c and transmits the MAC address to the cloud computing system 130. The cloud computing system 130 determines whether or not the AP 114c and the AP 124c are associated with the same wireless network system based on the discovery message or the one or more parameters transmitted from the network controller 112. For example, the RRM component 134 compares the MAC address of the AP 124c to the MAC addresses of the devices assigned to the wireless network system 110 to determine whether or not the AP 124c is part of the same wireless network system as the AP 114c. The RRM component 134 may transmit an indication to the network controller 112 with the determination as to whether or not the AP 124c is part of the wireless network system 110.

At operation 330, one of the network controllers 112 and the cloud computing system 130 determines whether or not the AP 124c supports client credential sharing for seamless transitioning of mobile devices between WLANs of different wireless network systems. For example, in one embodiment, the network controller 112 receives the discovery message transmitted by the AP 124c and identifies, based on value within the discovery message, that the AP 124c supports client credential sharing between different wireless network systems. The value within the discovery message is a flag or a binary value. Further, the discovery message indicates the name of the system associated with the AP and vender information, among others. The vender information corresponds to an access provider (e.g., an owner or the vender of the wireless network system).

In another embodiment, the network controller 112 transmits the discovery message or one or more parameters determined from the discovery message to the cloud computing system 130. In such embodiments, the cloud computing system 130 determines whether or not the AP 124c supports client credential sharing for seamless transitioning of mobile devices between WLANs of different wireless network systems. For example, the cloud computing system 130 identifies the access provider of a corresponding wireless network system, and compares the vendor a database to determine whether or not the wireless network system and corresponding AP supports client credential sharing for seamless transitioning of mobile devices between WLANs of different wireless network systems. When the AP 124c is found to support seamless transitioning of mobile devices, the mobile device 102 is able to seamlessly transition between the WLANs of the wireless network systems 110 and 120 without having to provide authentication credentials to each wireless network system. For example, once the mobile device 102 is authenticated to the wireless network system 110, the mobile device 102 is able to be authenticated to the wireless network system 120 without explicitly providing authentication credentials to the wireless network system 120 based on the previous succesful authentcation by the federation 170.

At operation 340, one or more of the network controllers 112 and the cloud computing system 130 detect interference between the AP 114c and the AP 124c. For example, in one embodiment, the network controller 112 detects interference between the AP 114c and the AP 124c. For example, the network controller 112 determines the channel of the AP 124c based on the discovery message and compares the channel of the AP 124c to the channel assigned to the AP 114c to determine whether co-channel interference exists between the APs 114c and 124c. In one embodiment, when the AP 114c and 124c are assigned to a common channel, co-channel interference exits between the APs.

In one or more embodiments, the cloud computing system 130 detects interference between the AP 114c and the AP 124c. For example, the cloud computing system 130 receives the channel allocation of the AP 114c and the AP 124c from the network controller 112 and/or the network controller 122. The cloud computing system 130 compares channels allocated to the APs 114c and 124c to determine if co-channel interference exits between the APs. In one embodiment, the RRM component 134 compares the channels allocated to the APs 114c and 124c to determine if co-channel interference exists.

At operation 350, one or more of the one or more of the network controller 112, the network controller 122, and the cloud computing system 130 changes at least one of a channel and a transmission power of the AP 114c and/or the AP 124c. In one embodiment, the network controller 112 changes at least one of a channel and a transmission power of the AP 114c. For example, based on a determination that co-channel interference exists between the AP 114c and the AP 124c, the network controller 112 changes the channel of the AP 114c. Alternatively, or additionally, based on the determination that co-channel interference exits between the AP 114c and the AP 124c, the network controller 112 changes the transmission power of the AP 114c. In another embodiment, based on the determination that co-channel interference exits between the AP 114c and the AP 124c, the network controller 112 provides an indication to the network controller 122 to change the channel of the AP 124c. Alternatively, or additionally, based on the determination that co-channel interference exits between the AP 114c and the AP 124c, the network controller 112 provides an indication to the network controller 122 to decrease the transmission power of the AP 124c.

In one or more embodiments, the cloud computing system 130 provides an indication to the network controller 112 and/or the network controller 122 to change a channel and/or transmission power of the AP 114c and/or the AP 124c, respectively. For example, in one embodiment, the cloud computing system 130 determines that interference is present between the APs 114c and 124c and transmits an indication to alter one or more of the channel and the transmission power of the AP 114c to the network controller 112 and/or an indication to alter one or more of the channel and the transmission power of the AP 124c to the network controller 122.

The network controller 112 alters one or more of the channel and transmission power of the AP 114c based on the indication transmitted by the cloud computing system 130. Additionally, or alternatively, the network controller 122 alters one or more of the channel and transmission power of the AP 124c based on the indication transmitted by the cloud computing system 130. In one embodiment, the cloud computing system 130 receives an indication that co-channel interference exists between the APs 114c and 124c from the network controller 112 and instructs the network controller 122 to change the channel allocated to the AP 124c. For example, the cloud computing system 130 provides an indication including the channel to allocate to the AP 124c to the network controller 122.

In another embodiment, a determination of insufficient coverage overlap between the APs 114c and 124c may be made. For example, the cloud computing system 130 may detect that the mobile device 102 was disconnected from both of the APs 114c and 124c when the mobile device 102 was attempting to seamlessly transition between the corresponding WLANs. In one embodiment, APs having insufficient coverage overlap have no overlap between corresponding coverage area. Alternatively, APs having insufficient coverage overlap may have overlapping coverage areas, however, the amount of overlap between coverage areas does not allow a mobile device to transition between corresponding WLANs without experiencing a drop in connection to either AP. In another embodiment, one of the network controllers 112 and 122 detect a disconnection of the mobile device 102 when the mobile device was attempting to seamlessly transition between the APs 114 and 124c. Dropping the connection of the mobile device 102 when attempting to seamlessly transition between the APs 114c and 124c provides an indication of insufficient overlap in coverage between APs 114c and 124c.

The cloud computing system 130 may communicate an indication of insufficient coverage overlap between the APs 114c and 124c to the network controller 112 or the network controller 122. The network controller 112 or 122 increases the transmission power of the AP 114c and 124c, respectfully, to increase the corresponding coverage areas based on the indication. In other embodiments, network controller 112 or 122 increases the transmission power of the AP 114c and 124c, respectfully, to increase the corresponding coverage areas based on the indication based on a determination of insufficient coverage overlap.

In one embodiment, the channel and/or transmission power of the interfering APs is changed by exchanging tokens between the APs (e.g., the AP 114c and 124c) and the AP with the smaller token changes a corresponding channel and/or transmission power. The tokens are randomly generated by each of the APs. In one example embodiment, the AP 114c generates a token with a value of 128 and the AP 124c generates a token with a value of 256. Accordingly, the AP 114c alters one or more of a corresponding channel and/or transmission power.

In one or more embodiments, the RRM component 134 generates a list of APs of different network systems, having overlapping coverage areas and that support seamless transitioning of mobile devices between corresponding wireless network systems. The RRM component 134 regulates the channels and transmission power of the identified APs to mitigate co-channel interference between APs.

While FIG. 3 is described with regard to the AP 124c transmitting a discovery message, in one or more embodiments the AP 114c additionally transmits a discovery message. In such embodiments, the discovery message transmitted by the AP 114c is received by the AP 124c and utilized by the network controller 122 and/or the cloud computing system 130 to determine whether or not to change the channel allocation of the AP 114c and/or the AP 124c. Further, to facilitate changing of a channel of the AP 114c, one or more of the channels of the APs 114a-114b is changed before the channel of the AP 114c is changed. Additionally, or alternatively, to facilitate changing of a channel of the AP 124c, one or more of the channels of the APs 124a-124b is changed before the channel of the AP 124c is changed.

Figure 4:
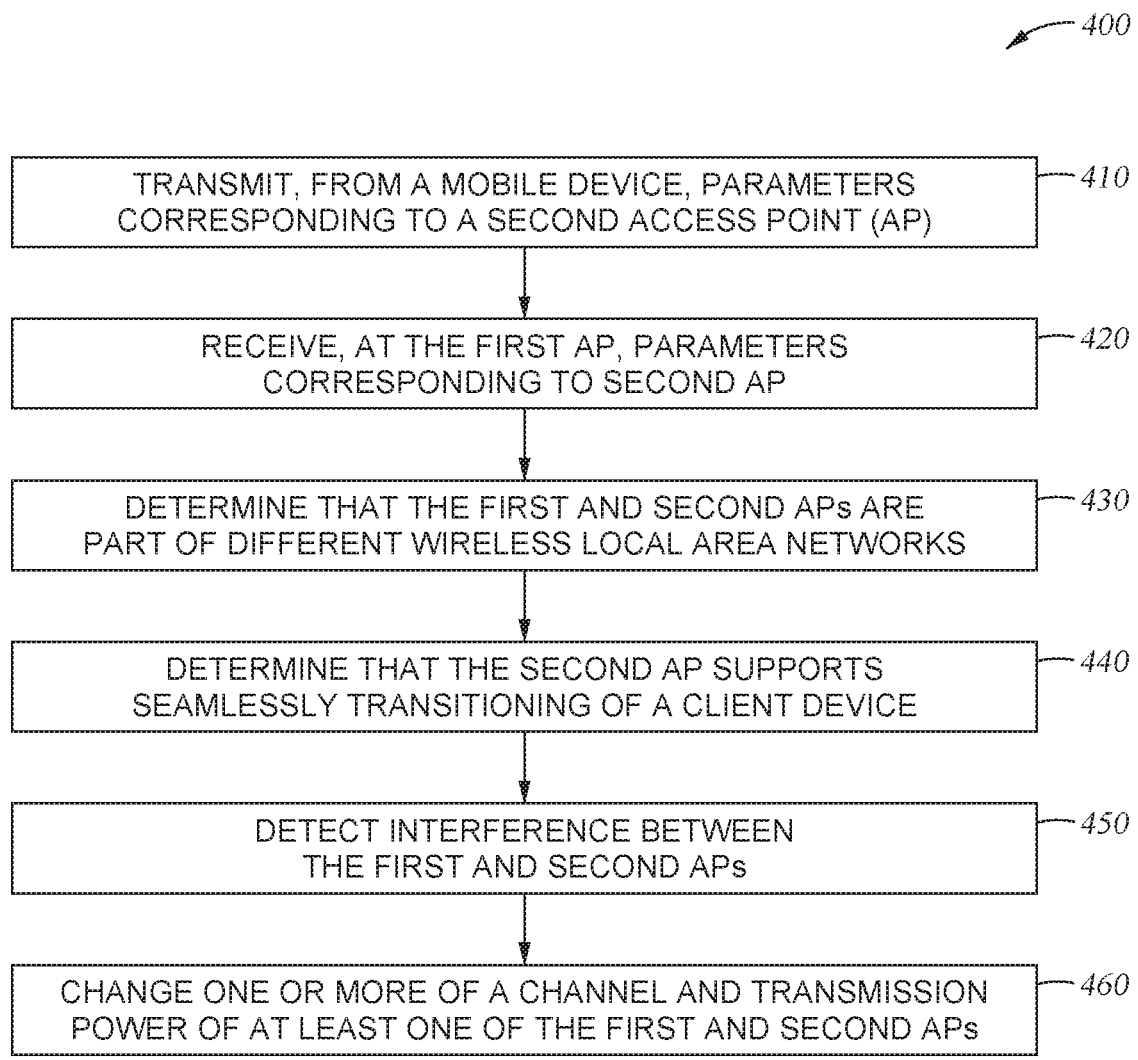
FIG. 4 is a flowchart illustrating a method for organizing access points, according to one or more embodiments.

FIG. 4 illustrates a method 400 for optimizing APs of different wireless network systems, according to one or more embodiments. At operation 410, the mobile device 102 transmits parameters corresponding to the AP 124c. In one embodiment, the mobile device 102 transmits parameters corresponding to the AP 124c in response to connecting with the AP 114c. For example, the mobile device 102 may transmit the channel allocated to the AP 124c, the transmission power of the AP 124c, the wireless network that the AP 124c is connected to, and support of seamless transitioning of mobile devices, among others. Additionally, the mobile device 102 transmits the signal strength of previously connected APs, and bandwidth of previously connected APs. In one or more embodiments, the mobile device 102 transmits parameters corresponding to two or more previous APs to which the mobile device 102 was connected.

The mobile device 102 transmits the parameters corresponding to the AP 124c as the transmission path between the APs 114c and 124c is interfered with by one or more barriers. For example, as shown in FIG. 5, the wall 510 interferes with the transmission path between the APs 114c and 124c. As such, the AP 114c and 124c are not able to directly communicate with each other and a discovery message transmitted by one of the APs is not received by the other AP. In one embodiment, the mobile device 102 transmits an identifier associated with previously connected wireless network systems. The identifier may include an indication as to whether or not a corresponding wireless network system supports seamless transitioning of mobile devices.

At operation 420, the AP 114c receives parameters corresponding to the AP 124c from the mobile device 102. For example, the AP 114c receives the parameters corresponding the AP 124c in response to the mobile device 102 connecting the AP 114c. Further, the method 400 includes operations 430-460 which are configured similar to that of operations 320-350 of FIG. 3, respectively. In one embodiment, while the operations 320-350 are described with regard to processing a discovery message, in the operations 430-460 the parameters received from the mobile device 102 are processed to determine if co-channel interference exists between the APs 114c and 124c.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for optimizing access points (APs) within a network, the method comprising:
receiving, at a first AP, parameters corresponding to a second AP, wherein the parameters comprise a media access control (MAC) address of the second AP;
determining that the first AP is part of a first wireless area network (WLAN) having a first extended service set, and the second AP is part of a second WLAN having a second extended service set different than the first extended service set based on a comparison of the MAC address to a list of MAC addresses associated with the first WLAN;
determining that the second WLAN supports client credential sharing allowing seamless transitioning of a client device between the first and second WLANs based on the parameters;
detecting co-channel interference between the first AP and the second AP based on the parameters corresponding to the second AP and parameters corresponding to the first AP; and
changing at least one of a channel and transmission power of one or more of the first AP and the second AP in response to the detection of the co-channel interference.

2. The method of claim 1, wherein the second AP is configured to transmit a discovery message comprising the parameters corresponding to the second AP, and wherein receiving, at the first AP, the parameters corresponding to the second AP comprises receiving the discovery message.

3. The method of claim 2, further comprising determining that the second AP supports client credential sharing based on a value of the discovery message.

4. The method of claim 1, wherein the parameters corresponding to the second AP are received from a mobile device in response to the mobile device connecting to the first AP.

5. The method of claim 1, wherein changing at least one of the channel and the transmission power of one or more of the first AP and the second AP comprises transmitting from a cloud computing system an indication to change at least one of the channel and the transmission power of one or more of the first AP and the second AP.

6. The method of claim 1, wherein changing at least one of the channel and the transmission power of one or more of the first AP and the second AP comprises communicating from a first network controller to a second network controller an indication to change at least one of the channel and the transmission power of the second AP.

7. The method of claim 1, wherein changing at least one of the channel and the transmission power of one or more of the first AP and the second AP comprises communicating, from a network controller of the first WLAN to the first AP, an indication to change at least one of the channel and transmission power of the first AP.

8. A wireless network system comprising:
  a first access point (AP) configured to receive parameters corresponding to a second AP, wherein the parameters comprises a media access control (MAC) address of the second AP; and
  a controller coupled to at least one of the first AP and the second AP and configured to:
    determine that the first AP is part of a first wireless local area network (WLAN) having a first extended service set and the second AP is part of a a second WLAN having a second extended service set different than the first extended service set based on a comparison of the MAC address to a list of MAC addresses associated with the first WLAN;
    determine that the second WLAN supports client credential sharing allowing seamless transitioning of a client device between the first and second WLANs based on the parameters;
    detect co-channel interference between the first AP and the second AP based on the parameters corresponding to the second AP and parameters corresponding to the first AP; and
    change at least one of a channel and transmission power of one or more of the first AP and the second AP in response to the detection of the co-channel interference.

9. The wireless network system of claim 8, wherein the second AP is configured to transmit a discovery message comprising the parameters corresponding to the second AP, and wherein receiving the parameters corresponding to the second AP comprises receiving the discovery message.

10. The wireless network system of claim 9, wherein the controller is further configured to: determine that the second AP supports client credential sharing based on a value of the discovery message.

11. The wireless network system of claim 8, wherein the parameters corresponding to the second AP are received from a mobile device in response to the mobile device connecting to the first AP.

12. The wireless network system of claim 8, wherein the controller is a controller of a cloud computing system and changing at least one of the channel and the transmission power of one or more of the first AP and the second AP comprises transmitting from the cloud computing system an indication to change at least one of the channel and the transmission power of one or more of the first AP and the second AP.

13. The wireless network system of claim 8, wherein the controller is a first network controller and changing at least one of the channel and the transmission power of one or more of the first AP and the second AP comprises communicating from the controller to a second network controller an indication to change at least one of the channel and the transmission power of the second AP.

14. The wireless network system of claim 8, wherein changing at least one of the channel and the transmission power of one or more of the first AP and the second AP comprises communicating, to the first AP, an indication to change the at least one of the channel and the transmission power of the first AP.

15. A network comprising:
  a first wireless network system forming a first local area network (WLAN) having a first extended service set, the first wireless network system comprising:
    a first access point (AP); and
    a first network controller coupled to the first AP; and
  a second wireless network system forming a second WLAN having a second extended service set different than the first extended service set, the second wireless network system comprising:
    a second AP configured to receive parameters corresponding to the first AP, the parameters comprising a media access control (MAC) address of the first AP; and
    a second network controller coupled to the second AP; and
  a cloud computing system coupled to the first network controller and the second network controller, the cloud computing system configured to:
    determine that the first AP is assigned to the first WLAN and the second AP is assigned to the second WLAN based on a comparison of the MAC address of the first AP to a list of MAC addresses associated with the second WLAN;
    determine, based on the parameters corresponding to the first AP, that the first WLAN supports client credential sharing allowing seamless transitioning of a client device between the first and second WLANs;
    detect co-channel interference between the first AP and the second AP based on the parameters corresponding to the first AP and parameters corresponding to the second AP; and
    change at least one of a channel and transmission power of one or more of the first AP and the second AP in response to the detection of the co-channel interference.

16. The network of claim 15, wherein the first AP is configured to transmit a discovery message comprising the parameters corresponding to the first AP, and wherein receiving the parameters corresponding to the first AP comprises receiving the discovery message.

17. The network of claim 16, wherein the cloud computing system is further configured to: determine that the first AP supports client credential sharing based on a value of the discovery message.

18. The network of claim 15, wherein the parameters corresponding to the first AP are received from a mobile device in response to the mobile device connecting to the second AP.

19. The network of claim 15, wherein the cloud computing system is further configured to transmit an indication to change at least one of the channel and the transmission power of the first AP to the first network controller.

20. The network of claim 15, wherein the cloud computing system is further configured to transmit an indication to change at least one of the channel and the transmission power of the second AP to the second network controller.

\* \* \* \* \*

UNITED STATES PATENT AND TRADEMARK OFFICE
CERTIFICATE OF CORRECTION

PATENT NO. : 11,330,600 B2
APPLICATION NO. : 16/752435
DATED : May 10, 2022
INVENTOR(S) : Vishal S. Desai et al.

It is certified that error appears in the above-identified patent and that said Letters Patent is hereby corrected as shown below:

On the Title Page

Item [56], Column 2, under "Other Publications", Line 2, delete "Interantional" and insert
-- International --.

In the Specification

Column 6, Line 24, delete "24a-124c," and insert -- 124a-124c, --.

Column 8, Line 16, delete "succesful authentcation" and insert -- successful authentication --.

In the Claims

Column 13, Line 42, in Claim 8, delete "of a a" and insert -- of a --.

Signed and Sealed this
Third Day of January, 2023

Katherine Kelly Vidal
*Director of the United States Patent and Trademark Office*